Patented Apr. 18, 1950

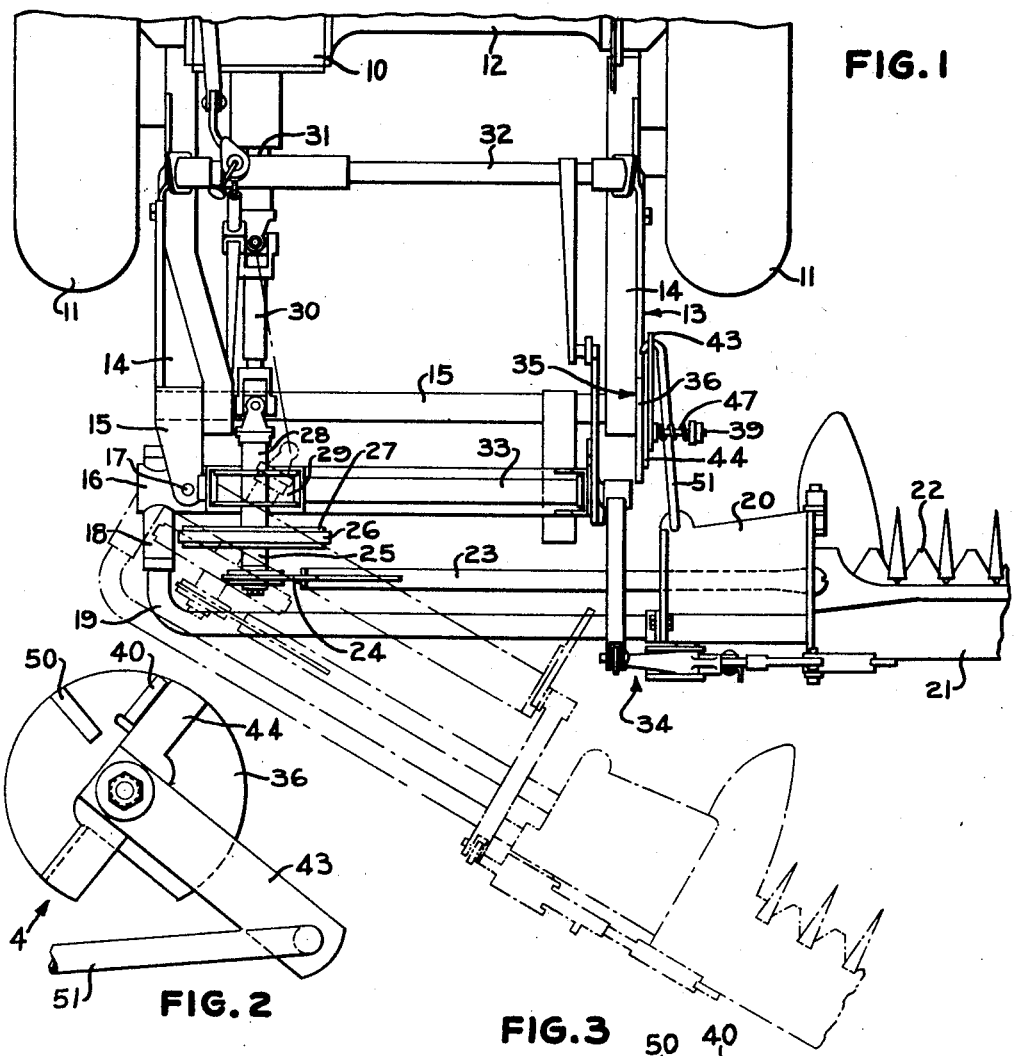

2,504,686

UNITED STATES PATENT OFFICE 2,504,686

CUTTING MECHANISM RELEASE FOR MOWERS

Samuel E. Hilblom, Chicago, Ill., assignor to International Harvester Company, a corporation of New Jersey Original application October 18, 1943, Serial No. 506,661. Divided and this application June 20, 1947, Serial No. 755,946

14 Claims. (Cl. 56—25)

This application is a division of my co-pending application, Serial Number 506,661, filed October 18, 1943, now Patent 2,454,697, issued November 23, 1948.

The invention relates to a mower, and more particularly to a mower of the type in which a supporting frame carries cutting mechanism for release in response to the striking of an obstruction by the latter.

Mowers of the type generally referred to are conventional in the respect that the mower structure includes a carrying or supporting frame on which the cutting mechanism is carried for movement with respect to the carrying frame in a direction opposite to that in which the mower structure is traveling. In some instances, the cutting mechanism is pivoted to the carrying frame for such rearward swinging movement about a vertical axis; in other instances, the rearward movement of the cutting mechanism with respect to the supporting frame may be translatory. Various types of release mechanisms have been provided for maintaining the normal or operating position of the cutting mechanism with respect to the supporting frame, these mechanisms being releasable in response to excessive force applied to the cutting mechanism upon the striking of an obstruction. Several problems arise in the construction and use of such mechanisms. One of the principal problems is involved in providing a release mechanism that is simple in construction, in operation, and not likely to require constant attention. Another problem is to provide a release mechanism that is automatically restorable to its initial position when the cutting mechanism is returned to its normal position after the obstruction has been eliminated.

The invention contemplates and has for an important object the provision of an improved release mechanism overcoming the disadvantages of previous devices and incorporating the features of simple and fool-proof construction and automatic restoration. Another object of the invention is to provide a release mechanism comprising relatively few parts, preferably in the form of a pair of members connected together for relative movement and normally lockable by yieldable locking means controllable by the cutting mechanism as it swings or moves from operating position to release position and is returned to operating position. Another object of the invention is to provide the releasable device in such manner that it may be readily attached to conventional mowers.

The foregoing and other important objects and desirable features of the invention will appear in greater detail in the following description of a preferred embodiment of the invention, taken in conjunction with the accompanying sheet of drawings, in which:

Fig. 1 is a plan view of the rear portion of a mower of one type in which the invention may be utilized;

Fig. 2 is an enlarged side view of a portion of the release mechanism by itself, the view illustrating the parts of the mechanism in normal position;

Fig. 3 is a view similar to that appearing in Fig. 2, but with the parts in released position; and Fig. 4 is an end elevational view of the structure shown in Fig. 2, the view being taken substantially in the direction of the arrow 4 on Fig. 2.

Although the following description will proceed with respect to the invention as utilized in a tractor mounted mower, it should be understood that the invention may be similarly used in mowers of other types. The exact details of construction forming the basis of the present disclosure should not be taken as limiting the application of the invention.

Only the rear portion of the tractor on which the mower is mounted is shown in the drawings. The tractor includes a main frame 10 carried on a pair of rear traction wheels 11 and a transverse axle structure 12. The carrying or supporting frame for the mower is indicated generally by the numeral 13 and comprises a pair of rearwardly extending supporting members 14 connected at their rear ends by a transverse frame member 15. The structure of the mower frame forms no part of the present invention. The details thereof are disclosed and claimed in my co-pending application Serial No. 747,037, filed May 9, 1947.

The left-hand or stubbleward end of the frame 13 carries rigidly thereon a supporting bracket 15 on which is mounted a second bracket 16. The connection between the brackets 15 and 16 may be formed by a vertical pivot member 17. The bracket 16 includes a longitudinal sleeve 18 in which is carried the forwardly bent end of a transversely extending coupling bar 19. The coupling bar forms part of the cutting mechanism frame to be presently described. The connection between the coupling bar 19 to the sleeve 18 of the bracket 16 is on a longitudinal horizontal axis so that the coupling bar may have vertical movement with respect to the supporting frame 13. The cutting mechanism frame is completed by a yoke 20 connected to the right-hand end of the coupling bar and cutting mechanism including a cutter bar 21 and knife 22. The cutter bar 21 may be connected to the yoke 20 in the conventional manner.

The cutting mechanism is driven by a transverse pitman 23, connected at its grassward end to the knife 22 and at its stubbleward end to an eccentric 24 carried on a shaft 25 driven by a belt 26 on a pulley 27. The pulley 27 is in turn carried by a shaft 28 which is journaled in a bearing 29 associated with the bracket 16. The shaft 28 is driven by a telescopic drive shaft 30 connected to a power take-off shaft 31 of the tractor. The drive for the cutting mechanism may be generally conventional and forms no detailed part of the present invention.

The raising and lowering of the cutting mechanism with respect to the coupling bar 19 is accomplished through a rock shaft 32 on the frame 13 and connections between that rock shaft and a second rock shaft 33 on the cutting mechanism frame. The latter rock shaft is connected by suitable linkage, indicated generally at 34, with the cutter bar 21. This construction likewise may be of any suitable type, one form of which is illustrated in greater detail in my co-pending application, Serial Number 506,661, now Patent No. 2,454,697 issued November 23, 1948 identified above.

The normal operating position of the cutting mechanism frame is that shown in solid lines in Fig. 1. The pivot 17 between the supporting frame 13 and coupling bar 19 permits the cutting mechanism to swing to the position shown in broken lines in Fig. 1 upon the encountering of an obstruction. The cutting mechanism is maintained in its operating position and is releasable for movement to its released position by means to be described below.

The supporting frame 13 includes at the grassward side thereof a support indicated generally by the numeral 35. The support includes a disc or plate 36 provided with a pair of substantially diametrically opposed recesses 37 and 38 (Figs. 2 and 3), both of which open radially outwardly with respect to the center of the plate 36. The plate 36 includes, preferably integrally therewith, a laterally grasswardly extending shaft or stud 39. The recess 37 is bordered at one edge thereof by an outstanding lug 40 rigidly secured to or formed as a part of the plate 36. The opposite edge of the recess 37 is provided with an inclined or beveled surface 41 (Fig. 3). The recess 38 is provided by means of a relatively large portion of the plate 36 being cut out, and along its marginal edge that extends substantially diametrically in line with the beveled edge 41 of the recess 37 is provided with a beveled or inclined surface 42. The portions thus described provide cam elements that are cooperatively engageable with cam elements on a second portion of the release mechanism that will be described below.

The second portion of the mechanism preferably takes the form of an arm 43 carried by the shaft 39 for angular movement relative to the plate 36. The arm carries rigidly thereon a cross member 44 which normally lies diametrically across the plate 36 in such a manner that it is coincident generally with the diameter of the plate passing through the recesses or notches 37 and 38 (Fig. 2). Each of the diametrically opposite ends of the member 44 is provided with a cam lug 45. When the parts are in the positions shown in Fig. 2, the lug 45 at one end of the member engages the recess 37, and the other lug 45 fits into the recess 38. Each of the lugs 45 is provided with a beveled edge 46. The lug 45 that fits in the recess 37 has its beveled edge 46 complementary to the beveled edge 41 of that recess, and the beveled edge of the other lug is complementary to the beveled edge 42 of the recess 38 (Fig. 4). Although the structural details of only one end of the member 44 are visible in Fig. 4, it should be understood that the opposite ends are symmetrical to accomplish the association with the recesses 37 and 38 as described above.

The release mechanism includes yieldable means, preferably in the form of a coiled compression spring 47, interposed between the outer face of the arm 43 and a washer 48 secured to the shaft 39 by a nut 49. The function of the spring 47 is to maintain the member 44 in releasably locked position against the plate 36 so that the cam elements on the two parts are engaged.

The plate 36 further includes a stop member in the form of a lug 50 rigidly secured to the outer face of the plate. The arm 43 may be connected, as by a link 51, to the yoke 20 of the cutting mechanism frame. The link is of course rigid, at least in the direction corresponding to movement of the cutting mechanism frame with respect to the supporting frame, the purpose of which will be presently described.

In the operation of a mower equipped with the releasable device herein set forth, the cutting mechanism is normally disposed as in Fig. 1, with the cutter bar 21 extending laterally at the grassward side of the supporting frame 13. The parts of the release mechanism will be in the positions shown in Fig. 2. When the cutter bar encounters an obstruction, a rearward force is imparted thereto of such nature as to tend to swing the arm 43 in a clockwise direction (as viewed in Figs. 2 and 3), the link 51 thus being placed under tension. The compression on the spring 47 will be overcome if the force is of sufficient magnitude and the surfaces 46 on the lugs 45 of the member 44 will cam over the cam surfaces 41 and 42 of the recesses 37 and 38 respectively as the member 44 and arm 43 move both angularly and axially on the shaft 39 with respect to the plate 36.

The cutting mechanism frame will then swing to the position shown in broken lines in Fig. 1. The lug 45 that normally engages the recess 38 will now have moved angularly about the axis of the shaft 39 to a position where further angular movement thereof is interrupted by the stop 50 on the plate 36. The engagement of the arm 44 with the stop 50 prevents further movement of the arm and, because of the link 51, further rearward movement of the cutting mechanism is prevented.

The tractor may be reconnected to the cutting mechanism frame by means of moving the tractor rearwardly with respect to the cutting mechanism of the cutting mechanism forwardly with respect to the tractor, due regard being had to the elimination of the obstruction that caused rearward swinging of the cutter bar. In either event, relative movement between the supporting frame 13 and cutting mechanism frame for the purpose of restoring the cutting mechanism to operating position also effects restoration of the releasable device to its initial position. Since the link 51 is rigid and is connected between the yoke 20 and arm 43, return movement of the cutter bar will effect counter-clockwise angular movement of the arm 43 and cross member 44 and will thus effect reengagement between the lugs 45 and the recesses 37 and 38 in the plate 36.

The structural and operational advantages of the release mechanism herein set forth over those heretofore known will be apparent to those skilled in the art. It should be understood, of course, that the present embodiment of the invention is subject to numerous modifications and alterations, all of which may be made without departing from the spirit and scope of the appended claims.

What is claimed is:

1. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a stationary cam plate on one frame; a movable cam plate associated with the stationary plate for angular and axial movement relative thereto; means providing cooperating cam elements on the plates interengageable to hold the plates against relative angular and axial movement; yieldable means acting on the plates to yieldably maintain interengagement of the cam elements; means providing a crank arm on the movable plate; and means connecting the crank arm to the other of the aforesaid frames to impart angular and axial movement to the movable cam plate as the cutting mechanism frame is forced rearwardly upon the encountering of an obstruction thereby.

2. Releasable means for a mower as set forth in claim 1, in which: the cooperating cam elements include a recess in one cam plate and a lug on the other cam plate normally engaging the recess.

3. Releasable means for a mower as set forth in claim 2, in which: the cam plate having the recess includes a stop element engageable by the lug on the other cam plate after predetermined relative angular movement of the cam plates.

4. Releasable means for a mower as set forth in claim 1, in which: the means connecting the crank arm to the said other mounting member is rigid in the direction of return movement of the cutting mechanism from released position to operating position so that such return movement of the cutting mechanism acts to restore the initial positioning of the cam plates.

5. Releasable means for a mower as set forth in claim 1, in which: the axis of relative angular movement of the cam plates is normal to the direction of travel of the mower; and one cam plate is in the form of a disk on which its interengageable cam element is disposed radially.

6. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a pair of members relatively angularly movable about a common axis and relatively axially movable along said common axis; releasable elements respectively on the members and normally cooperatively engageable to prevent relative angular and axial movement; yieldable means normally effecting engagement of the releasable elements; means for connecting one member to the mower supporting frame; and means for connecting the other member to the cutting mechanism, said means including a crank arm associated with said other member.

7. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a support including a shaft on one frame extending normal to the direction of travel of the mower; a release element carried by the shaft for angular movement relative thereto and for shifting axially thereon; means connecting the release element to the other of said frames, said connecting means including a crank arm; means on the support normally engaging the release element to prevent relative angular movement thereof; and yieldable means also on the support to prevent axial shifting of the release element except in response to forces imparted to the release element through the aforesaid connecting means when the cutting mechanism frame encounters an obstruction.

8. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a support on one frame; an arm carried by the support for angular and axial movement relative thereto; means connecting the arm to the other frame and rigid at least in the direction of movement of the cutting mechanism frame from released to operating position, whereby the arm will be moved angularly and axially on the support when the cutting mechanism frame moves from operating to released position and is returned to operating position; and yieldable locking means normally preventing angular and axial movement of the arm and unlockable in response to forces transmitted through the arm and connecting means by the cutting mechanism frame when the latter encounters an obstruction, said yieldable locking means being restorable to normal position through the arm and the aforesaid connecting means when the cutting mechanism frame is returned to operating position.

9. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a support on one frame; an arm carried by the support for angular and axial movement relative thereto; means connecting the arm to the other frame and rigid at least in the direction of movement of the cutting mechanism frame from released to operating position, whereby the arm will be moved on the support when the cutting mechanism frame moves from operating to released position and is returned to operating position; and a releasable locking device normally preventing movement of the arm and unlockable in response to forces transmitted through the arm and connecting means by the cutting mechanism frame when the latter encounters an obstruction, said releasable locking device being restorable to normal position through the arm and the aforesaid connecting means when the cutting mechanism frame is returned to operating position.

10. For a mower having a supporting frame and a cutting mechanism frame carried by the supporting frame for movement relative to the supporting frame from an operating position to a released position upon the striking of an obstruction: means for holding the cutting mechanism frame in operating position and releasable to provide for the movement of the cutting mechanism frame to the aforesaid released position, comprising a support on one frame; an arm carried by the support for angular and axial movement relative thereto; means connecting the arm to the other frame, whereby the arm will be moved angularly and axially in one direction on the support when the cutting mechanism frame moves from operating to released position; yieldable locking means normally preventing angular and axial movement of the arm and unlockable in response to forces transmitted through the arm and connecting means by the cutting mechanism frame when the latter encounters an obstruction; and means for moving the arm in the opposite direction to restore the locking means to normal position when the cutting mechanism frame is returned to operating position.

11. In a vehicle attached mower, a yieldable latch interposed between the vehicle and the mower whereby damage of the mower is eliminated upon striking an obstruction, said yieldable latch comprising a stationary plate member, an outwardly extending stud on said plate, an arm journaled for rotation and axial movement on said stud, and means for restricting rotation and axial movement of said arm with respect to said plate, said means including yielding means interposed between the arm and the stud.

12. In a vehicle attached mower having two parts, a yieldable latch interposed between the two parts of the mower whereby damage of the mower is eliminated upon striking an obstruction, said yieldable latch comprising a stationary plate member, an outwardly extending stud on said plate, an arm journaled for rotation and axial movement on said stud, and means for restricting rotation and axial movement of said arm with respect to said plate, said means comprising a plate having apertures and correspondingly shaped projections on said arm and yielding means interposed between the arm and the end of the stud.

13. In a vehicle attached mower having two parts, a yieldable latch interposed between the two parts of the mower whereby damage of the mower is eliminated upon striking an obstruction, said yieldable latch comprising a stationary plate member, an outwardly extending stud on said plate, an arm journaled for rotation and axial movement on said stud, means for restricting rotation and axial movement of said arm with respect to said plate, said means comprising a plate having apertures and correspondingly shaped projections on said arm, and a spring interposed between the end of the stud and the arm for tending to maintain engagement of said projections with the plate apertures.

14. In a vehicle attached mower having two parts, a yieldable latch interposed between the two parts of the mower whereby damage of the mower is eliminated upon striking an obstruction, said yieldable latch comprising a stationary plate member, an outwardly extending stud on said plate, an arm journaled for rotation on said stud, means for restricting rotation of said arm with respect to said plate, said means comprising a plate having apertures and correspondingly shaped projections on said arm, a spring interposed between the end of the stud and the arm for tending to maintain engagement of said projections with the plate apertures, and a stop projection on said plate member for limiting rotation of said arm when it overcomes the spring pressure.

SAMUEL E. HILBLOM.

REFERENCES CITED

The following references are of record in the file of this patent:

UNITED STATES PATENTS

| Number | Name | Date |
|---|---|---|
| 1,537,629 | Street | May 12, 1925 |
| 2,166,942 | Crumb | July 25, 1939 |
| 2,172,561 | Kruse | Sept. 12, 1939 |
| 2,291,987 | Rogers | Aug. 4, 1942 |